United States Patent Office 3,470,877
Patented Oct. 7, 1969

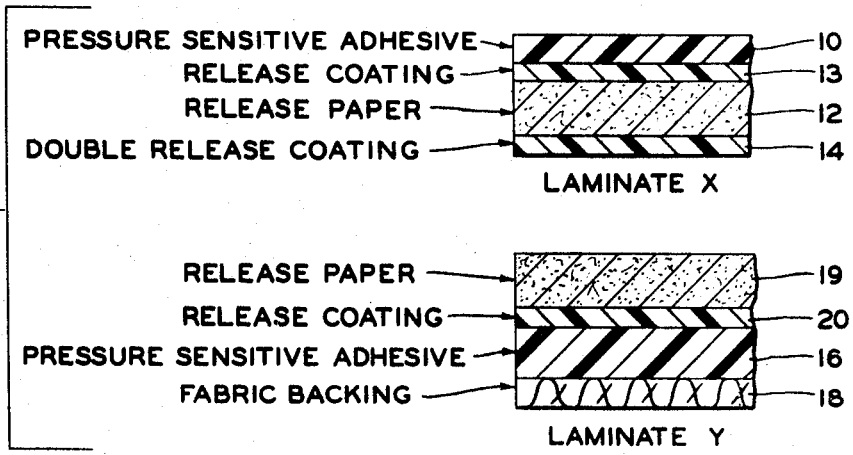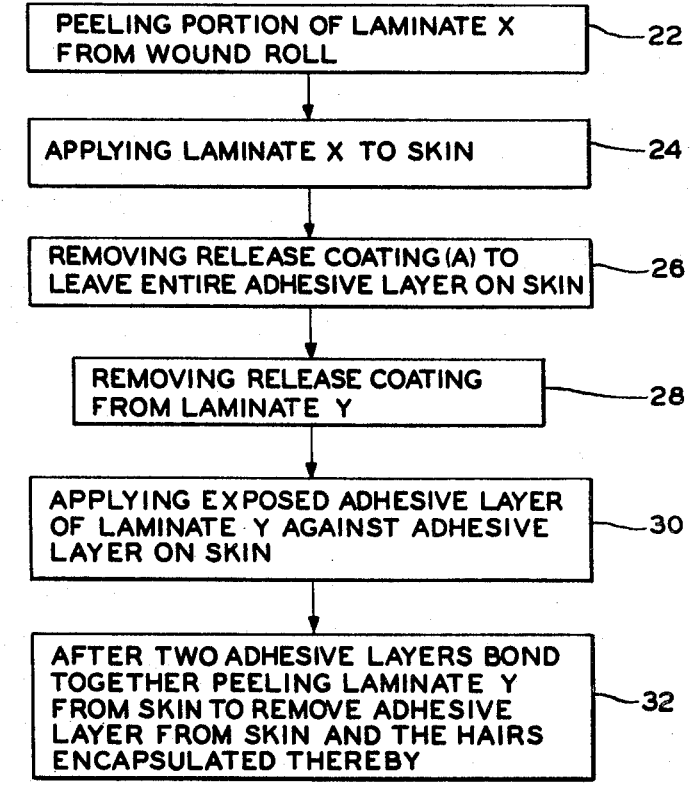

3,470,877
METHOD FOR REMOVING HAIRS FROM SKIN
Burton D. Morgan, Hudson, Ohio, assignor to Morgan Adhesives Company, Stow, Ohio, a corporation of Ohio
Filed Mar. 27, 1967, Ser. No. 626,329
Int. Cl. A61b 17/00
U.S. Cl. 128—355        2 Claims

ABSTRACT OF THE DISCLOSURE

A method for removing hairs from skin by placing a very thin layer of pressure sensitive fluid adhesive on the skin, which adhesive encapsulates the individual hairs to be removed. A second layer of higher viscosity pressure sensitive adhesive is then pressed against the first adhesive layer after which the second adhesive is peeled away from the skin, the fluid adhesive and the individual hairs encapsulated thereby being carried with the second adhesive as it is peeled away.

---

This invention relates to a method for removing hairs from skin, the method basically including the steps of applying a thin fluid adhesive layer to the skin area from which the hairs are to be removed, applying a second higher viscosity adhesive layer to the adhesive layer on the skin, and peeling away the second adhesive layer from the skin whereby the adhesive layer on the skin together with the individual hairs encapsulated thereby is carried with the second adhesive to effect a removal of the hairs from the skin.

For a more detailed disclosure of the method basically outlined above, reference should be had to the accompanying sheet of drawings wherein:

FIGURE 1 is a greatly enlarged fragmentary cross-sectional view of the two laminates used in the method steps or hair removing process of the invention; and FIGURE 2 is a block diagram of the method steps used to accomplish the hair removing process of the invention.

Referring to the drawings in greater detail, and referring first to FIGURE 1, the hair removing method of the invention is accomplished by the use of two laminates, labeled by FIGURE 1 as laminate X and laminate Y. Laminate X is used first in the hair removing process, and it is basically comprised of a thin pressure sensitive adhesive layer 10 and a release paper 12 having a double release coating 13 and 14 applied thereto. The pressure sensitive adhesive layer 10 is quite thin, having only a thickness of about 0.001 inches and it is substantially fluid or liquid in form. Double release coatings 13 and 14 are identical to each other and they are provided on release paper 12 so that a length of laminate X can be wound into a roll or the like for storage purposes.

Referring to laminate Y, it is comprised of a pressure sensitive adhesive layer 16 coated onto a cloth or fabric backing 18. A release paper 19 with a release coating 20 is provided to protect the pressure sensitive adhesive layer 16. Although the pressure sensitive adhesive layer 16 of laminate Y is substantially the same as the pressure sensitive adhesive layer 10 of the laminate X, adhesive layer 16 of laminate Y is approximately twice the thickness of the adhesive layer 10 of laminate X and also the adhesive layer 16 is of higher viscosity than the adhesive layer 10. The importance of these differences will become apparent as the method steps of the invention are explained hereinafter.

Referring to FIGURE 2, this block diagram basically illustrates the various method steps of the invention. Box 22 of FIGURE 2 discloses the first basic step of the hair removing method which is to peel away a length of laminate X from the roll on which it is wound. The fact that double release coating 14 is provided on laminate X easily allows the length of the laminate to be unwound from the wound roll.

After the laminate X is unrolled, box 24 indicates that the next step is to apply laminate X to the skin at that point where the individual hairs are to be removed. Laminate X is secured to the skin by merely pressing the exposed pressure sensitive adhesive layer 10 into contact with the skin. The next step of the method, indicated by box 26, is to peel away the release paper 12 of the laminate X in order to leave the entire adhesive layer 10 on the skin. Since the pressure sensitive adhesive layer 10 of the laminate X is a very thin fluid adhesive, when the release paper 12 and release coatings 13 and 14 are peeled away therefrom leaving the adhesive layer 12 on the skin, the fluid adhesive layer 10 flows around and encapsulates, surrounds, or engages the individual hairs to be removed.

At this point in the hair removing process or method, laminate Y is utilized in the next method step of the invention. The next step, as indicated by box 28, is to peel away the release paper 19 of laminate Y in order to expose the pressure sensitive adhesive layer 16. After such has been accomplished, the next method step, indicated by box 30, is to apply the exposed adhesive layer 16 of the laminate Y against the fluid adhesive layer 10 on the skin. This step is accomplished by merely picking up the laminate Y and placing the exposed adhesive layer 16 thereof against the skin where the fluid adhesive 10 remains. In order to insure a good bond between adhesive layer 16 of laminate Y and the fluid adhesive layer 10, the fabric backing 18 should be carefully smoothed out and pressed against the skin.

As pointed out above, adhesive layer 16 of laminate Y is substantially thicker than the fluid adhesive 10 and also is of a higher viscosity than the fluid adhesive 10. As a result, the fluid adhesive layer 10 readily bonds to adhesive layer 16 when the two adhesive layers are brought into contact with one another.

The next and last method step of the hair removing process, indicated by box 32, is to peel laminate Y from the skin. When such occurs, the adhesive layer 10 on the skin together with the individual hairs encapsulated thereby stick to and are carried with laminate Y as it is peeled away from the skin. Due to the greater viscosity and thickness of adhesive layer 16, the liquid adhesive layer 10 encapsulating the individual hairs is readily secured or bonded to laminate Y and can be peeled from the skin as a unit therewith. Both adhesive layer 16 of laminate Y and fluid adhesive layer 10 of laminate X are comprised of a rubber and a tackifier, and other compounding ingredients such as pigments, plasticizer, anti-oxidents, etc.

Since the peeling away of laminate Y causes the individual hairs encapsulated by fluid adhesive layer 10 to be carried therewith, the individual hairs will be removed from the body at that point on the skin where the laminate X was originally applied. Since the individual hairs are encapsulated quite close to their root portions, a quick peeling away of the laminate Y removes the hair from the skin with a minimum of pain. It is contemplated, however, that in order to reduce the pain as the individual hairs are pulled out of the skin, a small amount of a surface anesthetic, such as benzocaine, may be provided in the liquid adhesive layer 10.

The fluidity or liquidity of the adhesive 10 is provided in the usual manner of production of the adhesive and is regulated by control of the type of elastomer in the adhesive, the percent of tackifier used and/or the amount of plasticizer present and its type.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A method for removing hairs from skin including the steps of applying to the portion of the skin to be treated a first substantially fluid adhesive layer carried by a release member by pressing the pressure sensitive adhesive layer against the skin by means of the release member, removing the release member from the pressure sensitive adhesive layer, fixing a second pressure sensitive adhesive layer of at least twice the thickness of said first pressure sensitive adhesive layer, and bonded to a high strength carrier to said first pressure sensitive adhesive layer by pressing said second pressure sensitive adhesive layer into position by pressure applied to the high strength carrier, and where the adhesive coherence between the pressure sensitive adhesive layers is greater than between the first pressure sensitive adhesive layer and the skin, and withdrawing the high strength carrier for the second pressure sensitive adhesive layer from the skin whereby the adhesive layer on the skin together with the individual hairs engaged thereby is carried with the second pressure sensitive adhesive layer as the carrier is withdrawn from the skin.

2. A method according to claim 1 where the first pressure sensitive adhesive layer is .001 inches in thickness and has a small quantity of a surface anesthetic mixed therewith.

References Cited

UNITED STATES PATENTS

| 2,067,909 | 1/1937 | Fetter | 167—89 |
| 2,091,313 | 8/1937 | Grant | 167—89 |
| 2,377,774 | 6/1945 | Gotham | 167—89 |
| 2,425,696 | 8/1947 | Herrmann et al. | 128—355 X |

DALTON L. TRULUCK, Primary Examiner

U.S. Cl. X.R.

8—160